(12) United States Patent
DiRisio et al.

(10) Patent No.: US 6,205,293 B1
(45) Date of Patent: Mar. 20, 2001

(54) ROTARY ENGAGING LENS AND MOUNT ASSEMBLAGE

(75) Inventors: Anthony DiRisio, Rochester; Joel S. Lawther, East Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/504,446

(22) Filed: Feb. 16, 2000

(51) Int. Cl.[7] .................................................. G03B 17/02

(52) U.S. Cl. ............................. 396/6; 396/529; 359/819

(58) Field of Search .............................. 396/6, 529, 530, 396/531, 533; 359/811, 819

(56) References Cited

U.S. PATENT DOCUMENTS

| 4,153,340 | * | 5/1979 | Uesugi ................................. 359/819 |
| 4,957,341 | * | 9/1990 | Hasegawa ............................ 359/819 |
| 5,642,235 | | 6/1997 | Ichikawa .............................. 359/811 |
| 5,768,649 | | 6/1998 | Pearson ................................ 396/529 |
| 5,815,757 | | 9/1998 | Katsura et al. ...................... 396/529 |
| 5,969,887 | * | 10/1999 | Hagimori et al. .................. 359/819 |
| 6,088,160 | * | 7/2000 | Nomura et al. ..................... 359/819 |

* cited by examiner

*Primary Examiner*—David M. Gray
(74) *Attorney, Agent, or Firm*—Roger A. Fields (57) ABSTRACT

A rotary securing lens and mount assemblage has a lens and a mount for the lens which are secured to one another when the lens is rotated relative to the mount. The lens includes at least one cutting edge which is shaped to cut into the mount in order for the lens and the mount to become mutually engaged to be secured to one another when the lens is rotated.

11 Claims, 8 Drawing Sheets

ROTARY ENGAGING LENS AND MOUNT ASSEMBLAGE

CROSS REFERENCE TO RELATED APPLICATION

Reference is made to commonly assigned copending application Ser. No. 09/504,446, entitled DEFORMATION SECURING LENS AND MOUNT ASSEMBLAGE and filed Feb. 16, 2000 in the name of Anthony DiRisio.

FIELD OF THE INVENTION

The invention relates generally to the field of photography, and in particular to a rotary engaging lens and mount assemblage for a camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed filmstrip substantially prewound from a film take-up spool in the film cartridge onto a film supply spool in a film supply chamber in order to form an unexposed film roll on the film supply spool, a fixed-focus taking lens, a film metering mechanism with a rotatably supported metering sprocket that engages the filmstrip, a manually rotatable film winding thumbwheel coaxially engaged with the film take-up spool in the film cartridge, a single-blade shutter for exposing successive frames of the filmstrip, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film take-up spool in the film cartridge. This winds an exposed frame of the filmstrip from a rear backframe (exposure) opening in the main body part into the film cartridge, and advances an unexposed frame of the filmstrip from the unexposed film roll to the backframe opening. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel. When the metering lever engages the thumbwheel, further rotation of the thumbwheel is prevented. Manually depressing the shutter release button to take another picture pivots the metering lever out of engagement with the thumbwheel to permit renewed rotation of the thumbwheel. After the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the negatives and make prints for the customer. Most of the used parts such as the electronic flash can be recycled, i.e. reused, to remanufacture the one-time-use camera.

PRIOR ART PROBLEM

During original manufacture or remanufacture of the one-time-use camera, the taking lens must be secured to a mount for the lens. This must be done in a way that assures the lens is held fast to the mount.

By way of example, U.S. Pat. No. 5,642,235 issued Jun. 24, 1997 discloses a rotary securing lens and mount assemblage comprising a lens which has a central imaging portion and a circular rim portion with several engaging portions, and a mount for the lens which has several engageable portions equal in number to the engaging portions to engage with the respective engaging portions when the lens is rotated relative to the mount.

THE CROSS-REFERENCE APPLICATION

The cross-referenced application discloses a lens and mount assemblage that includes a lens and a mount for the lens which are secured to one another. The mount has elastic retaining members constructed to be deformed against the lens to secure the lens to the mount. A front cover part that fits over the lens and the mount has rigid deforming members arranged to deform the retaining members against the lens when the front cover part is fit over the lens and the mount

SUMMARY OF THE INVENTION

A rotary securing lens and mount assemblage comprising a lens and a mount for the lens which are secured to one another when the lens is rotated relative to the mount, is characterized in that:

one of the lens and mount includes a cutting edge which is shaped to cut into the other of the lens and mount in order for the lens and the mount to become mutually engaged to be secured to one another when the lens is rotated relative to the mount.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–8 show a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known flexible hook-in-hole connections 18.

Figure 1:
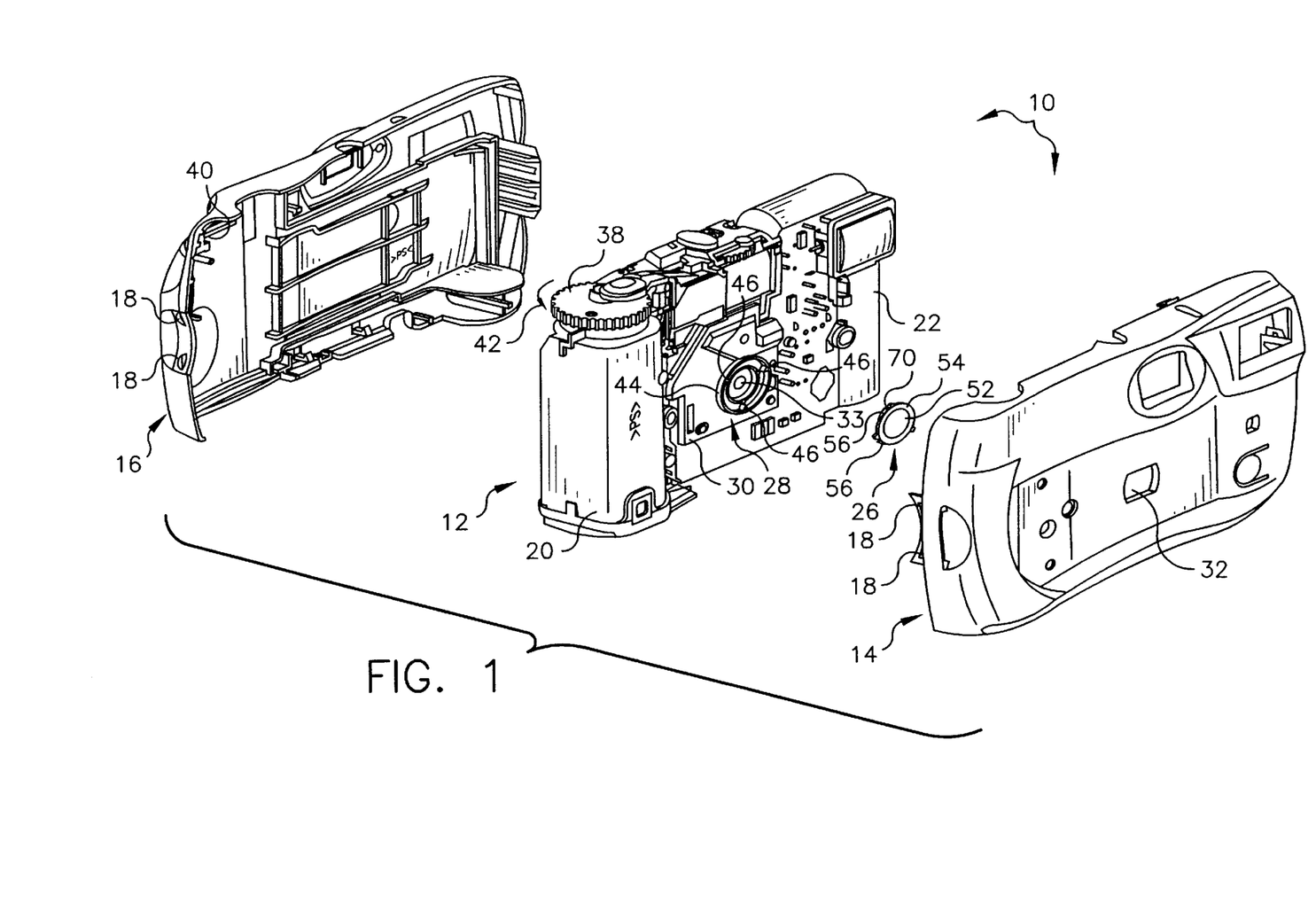
FIG. 1 is an exploded front perspective view of a one-time-use camera that includes a rotary engaging lens and mount assemblage according to a preferred embodiment of the invention.
Figure 2:
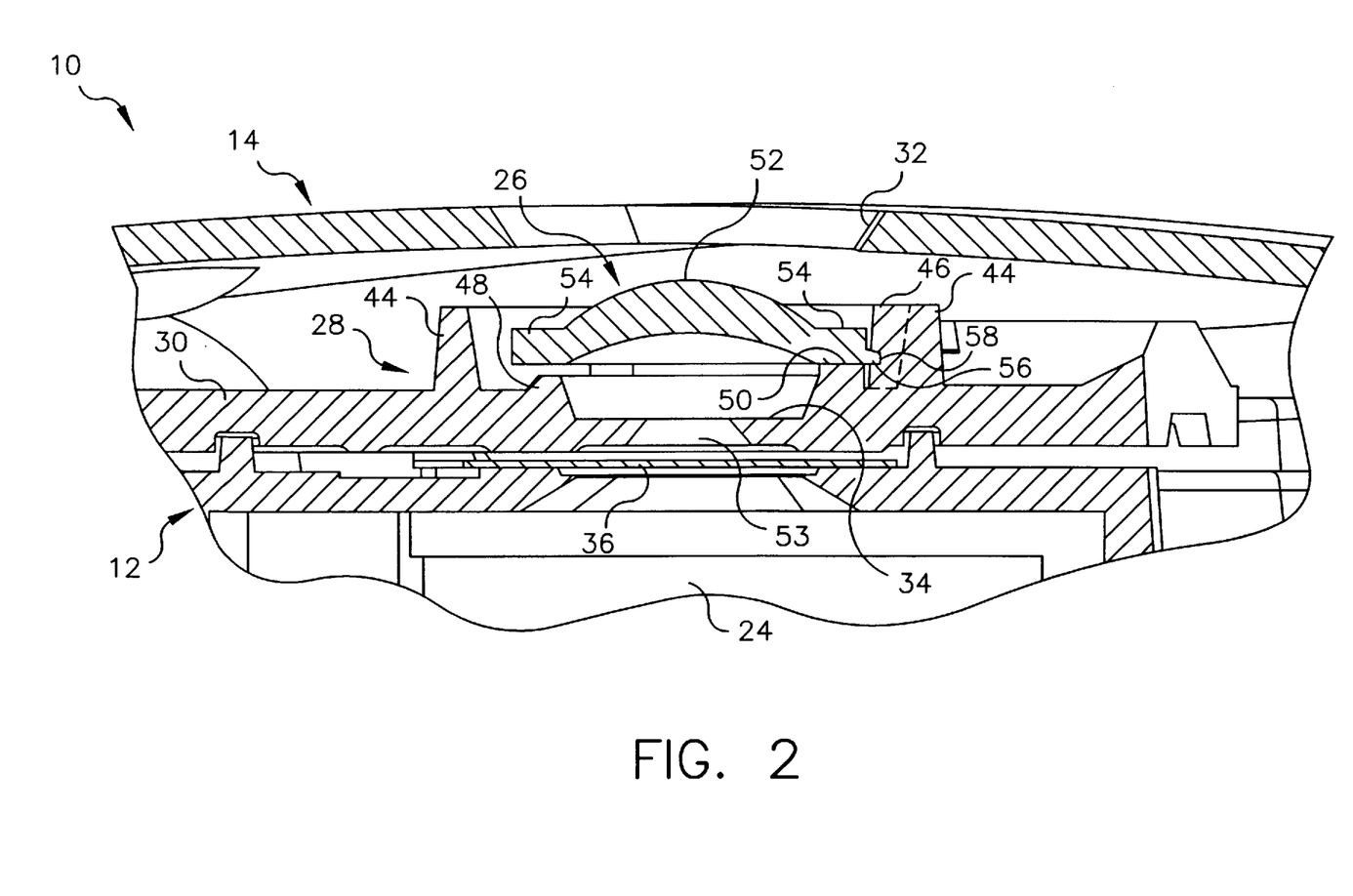
FIG. 2 is a sectional view of the lens and mount assemblage.

As is typical, the main body part 12 has a rearwardly open cartridge receiving chamber 20 for a film cartridge (not shown) and a rearwardly open film supply chamber 22 for an unexposed filmstrip (not shown). See FIG. 1. The unexposed filmstrip, except for a trailing end portion originally wound on a film take-up spool in the film cartridge is substantially pre-wound into an unexposed film roll in the film supply chamber 22 during manufacture of the one-time-use camera 10. A rearwardly open, rectangular-shaped backframe (exposure) opening 24, shown in FIG. 2, is located between the cartridge receiving chamber 20 and the film supply chamber 22 for exposing successive frames of the filmstrip when ambient light is received through a front taking lens 26. The front taking lens 26 is secured to a mount 28 for the lens which is integrally formed with a lens plate 30 connected to the main body part 12. The light is received through a front lens opening 32 in the front cover part 14, through the front taking lens 26, through a light admitting opening 33 in a bottom 34 of the mount 28, and into the backframe opening 24. See FIG. 2. A shutter blade 36 which normally blocks the light-admitting opening 33 is momentarily pivoted open to allow the light to enter the backframe opening 24 via the light-admitting opening.

A manual film winder or film winding thumbwheel 38, rotatably supported on the main body part 12, above the cartridge receiving chamber 20, radially protrudes partially from an elongate narrow opening 40 in the rear cover part 16 and has a depending coaxial stem (not shown) in coaxial engagement with an exposed top end of the film take-up spool in the film cartridge. The film winding thumbwheel 38 is manually grasped or fingered to rotate the thumbwheel in a film winding direction 42, i.e. counter-clockwise in FIG. 1, to rotate the film take-up spool in the same direction. The thumbwheel 38 is incrementally rotated decreasing angles of rotation to incrementally rotate the film take-up spool the same decreasing angles in order to wind the respective frames of the filmstrip from the unexposed film roll in the film supply chamber 22, to the backframe opening 24 for exposure, and then onto the film take-up spool. The film take-up spool must be rotated the decreasing angles to wind the respective frames onto the spool, because the resulting film roll (not shown) on the spool increases in diameter with each added frame.

Figure 4:
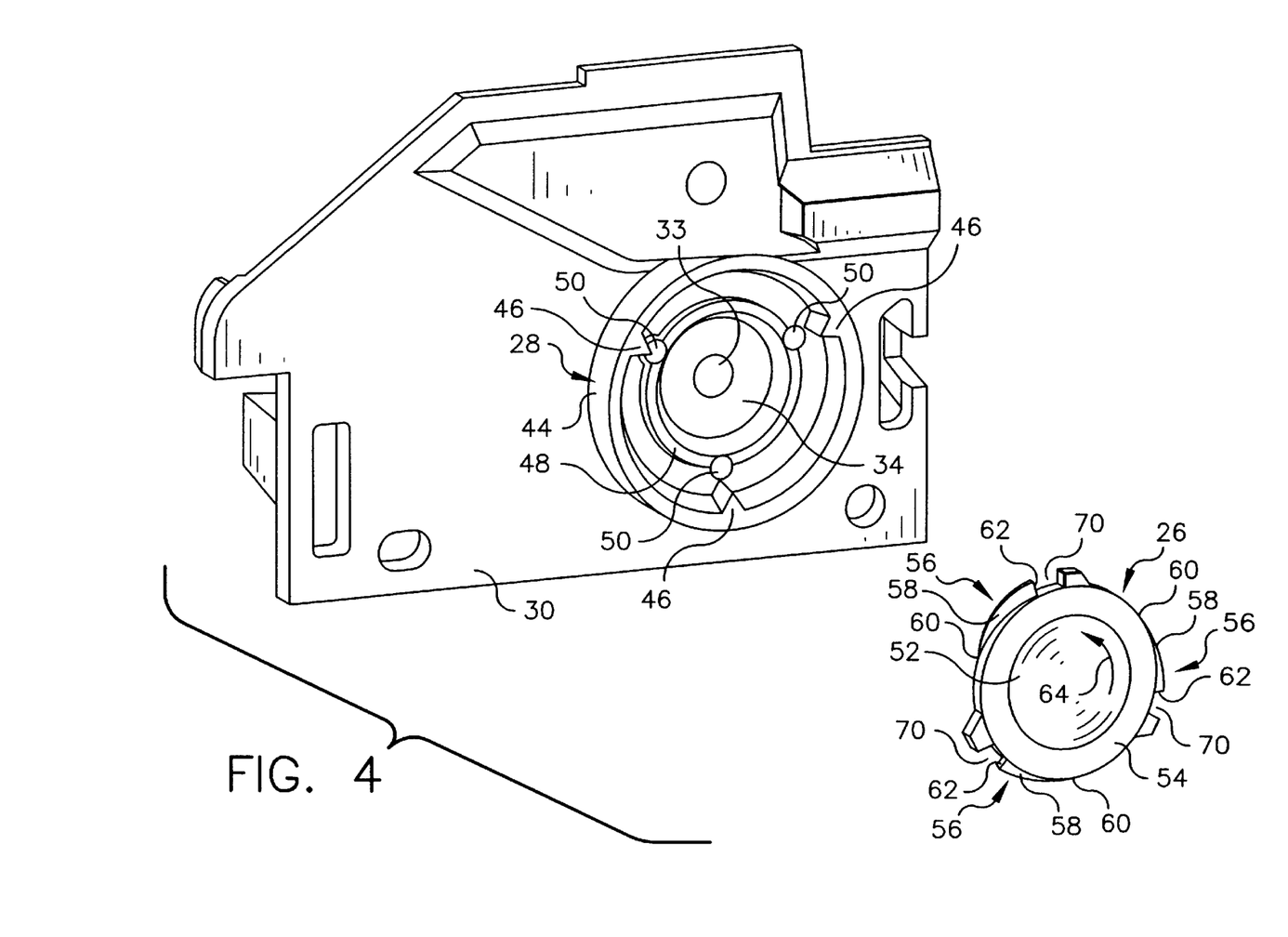
FIG. 4 is an exploded front perspective view of the lens and mount assemblage.
Figure 5:
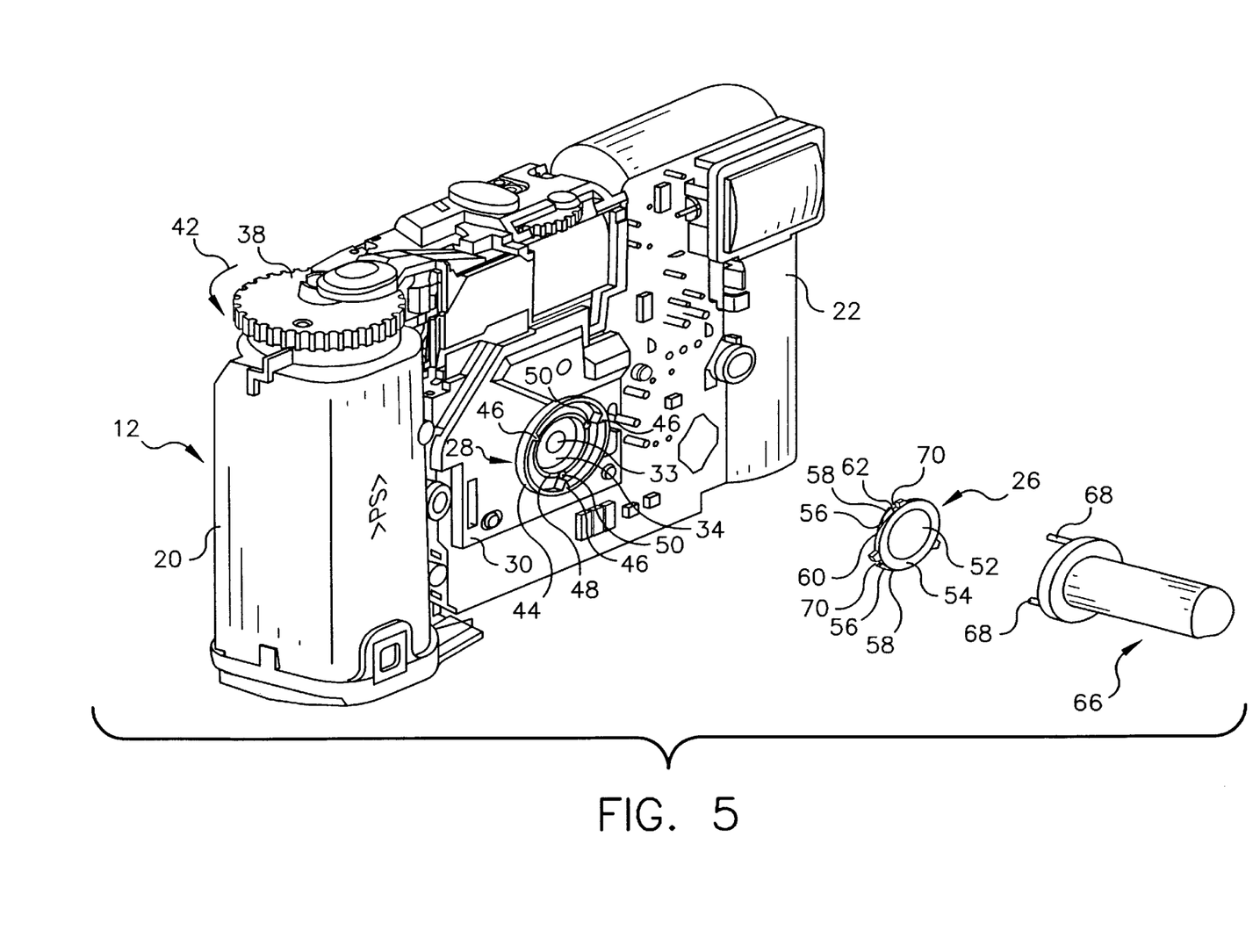
FIG. 5 is an exploded front perspective view of the lens and mount assemblage, and a rotation tool for rotating the lens to engage with the mount.
Figure 6:
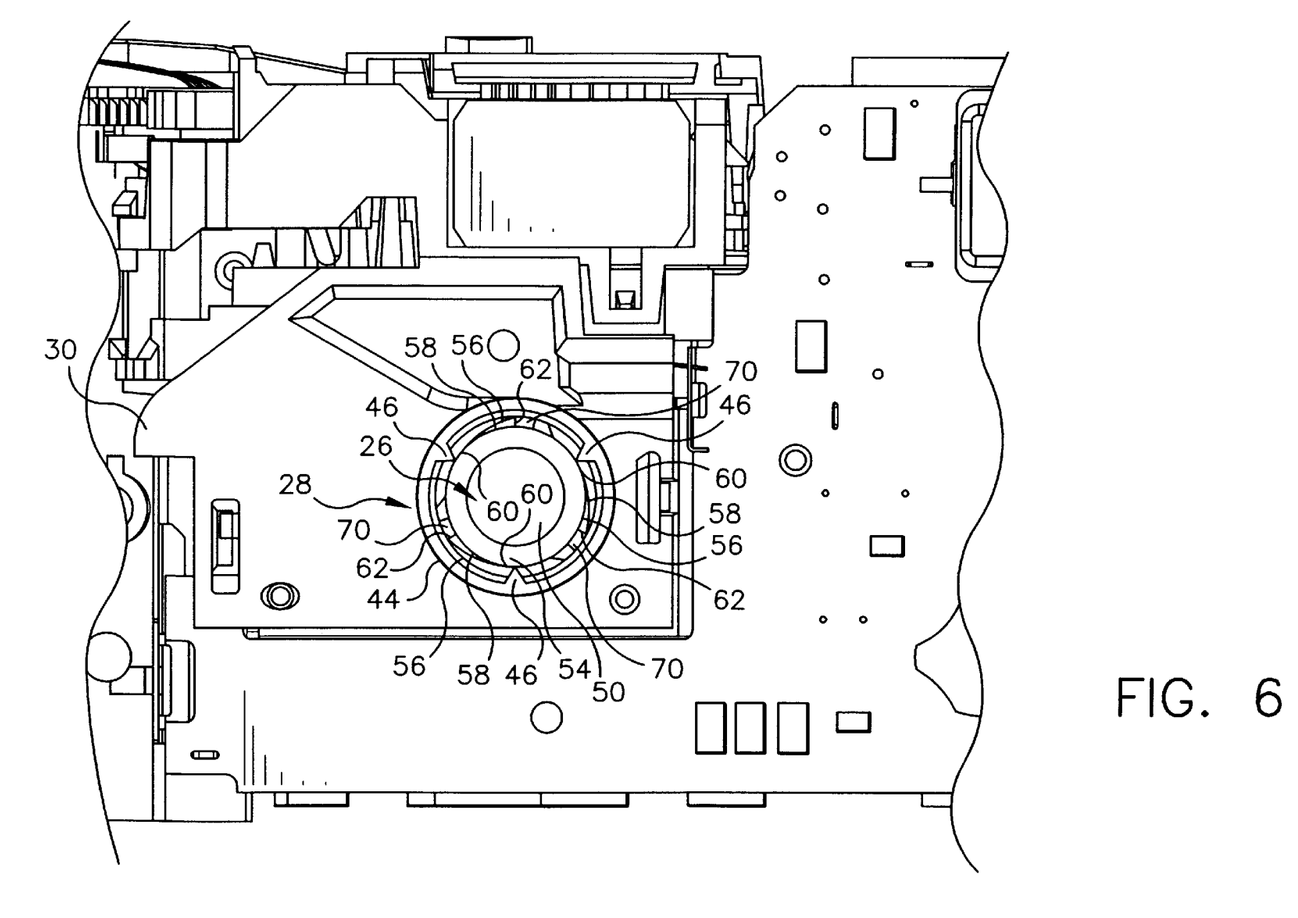
FIGS. 6–8 are front elevation views of the lens and the mount showing various stages of rotation of the lens relative to the mount in order to engage the lens with the mount.

The mount 28 for the front taking lens 26 has a circular peripheral rib 44 with three evenly spaced (120° apart) engageable portions 46 that project radially inward, and an inner circular ring 48 with three raised pads 50 positioned adjacent the respective engageable portions, as shown in FIGS. 2 and 4.

Figure 3:
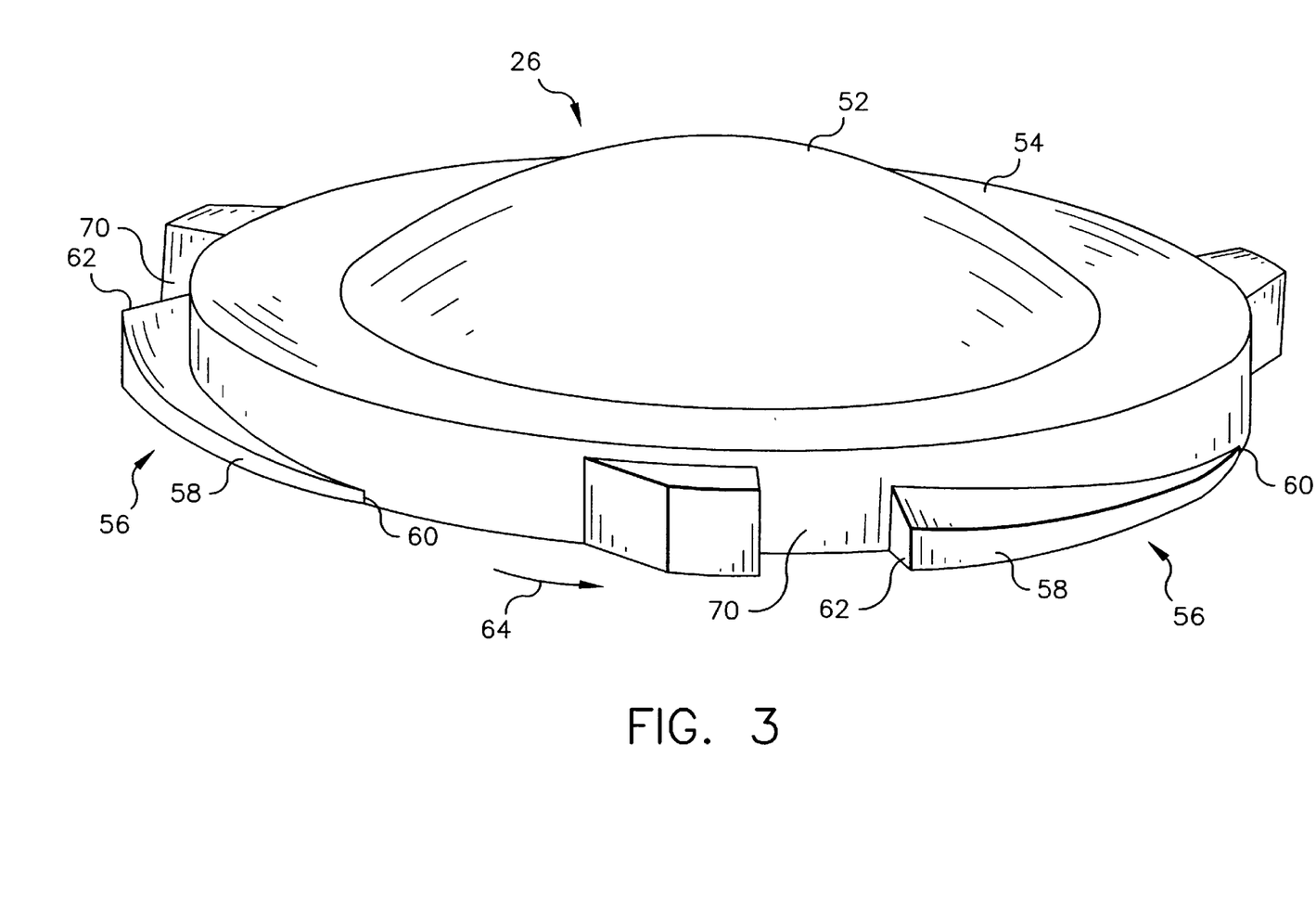
FIG. 3 is a perspective view of the lens.

The front taking lens 26 has a central imaging portion 52 and a circular rim portion 54 with three evenly spaced (120° apart) engaging portions 56 that are elongated partially about the circular rim portion and have individual curved cutting edges 58. See FIGS. 2–4. Each one of the engaging portions 56 has a gradual diminution in width from the circular rim portion 54 to one of the cutting edges 58 to similarly taper the engageable portions widthwise. This is shown in FIG. 3. Each one of the cutting edges 58 has a pair of extreme ends 60 and 62, the first one (60) of which is a leading end and the other (62) is a trailing end when the front taking lens 26 is rotated in a cutting direction 64, i.e. counter-clockwise in FIGS. 6–8. The cutting edges 58 are progressively narrowed from the leading ends 60 to the trailing ends 62 to similarly taper the cutting edges.

During manufacture of the one-time-use camera 10, the front taking lens 26 is placed on the three raised pads 50 of the mount 28 to position the cutting edges 58 of the lens with respect to the engageable portions 56 of the mount. See FIGS. 5 and 6. Then, a manual rotation tool 66 is rotationally coupled with the front taking lens 26, by inserting three evenly spaced pins 68 on the tool in individual peripheral notches or gaps 70 in the lens.

Figure 7:
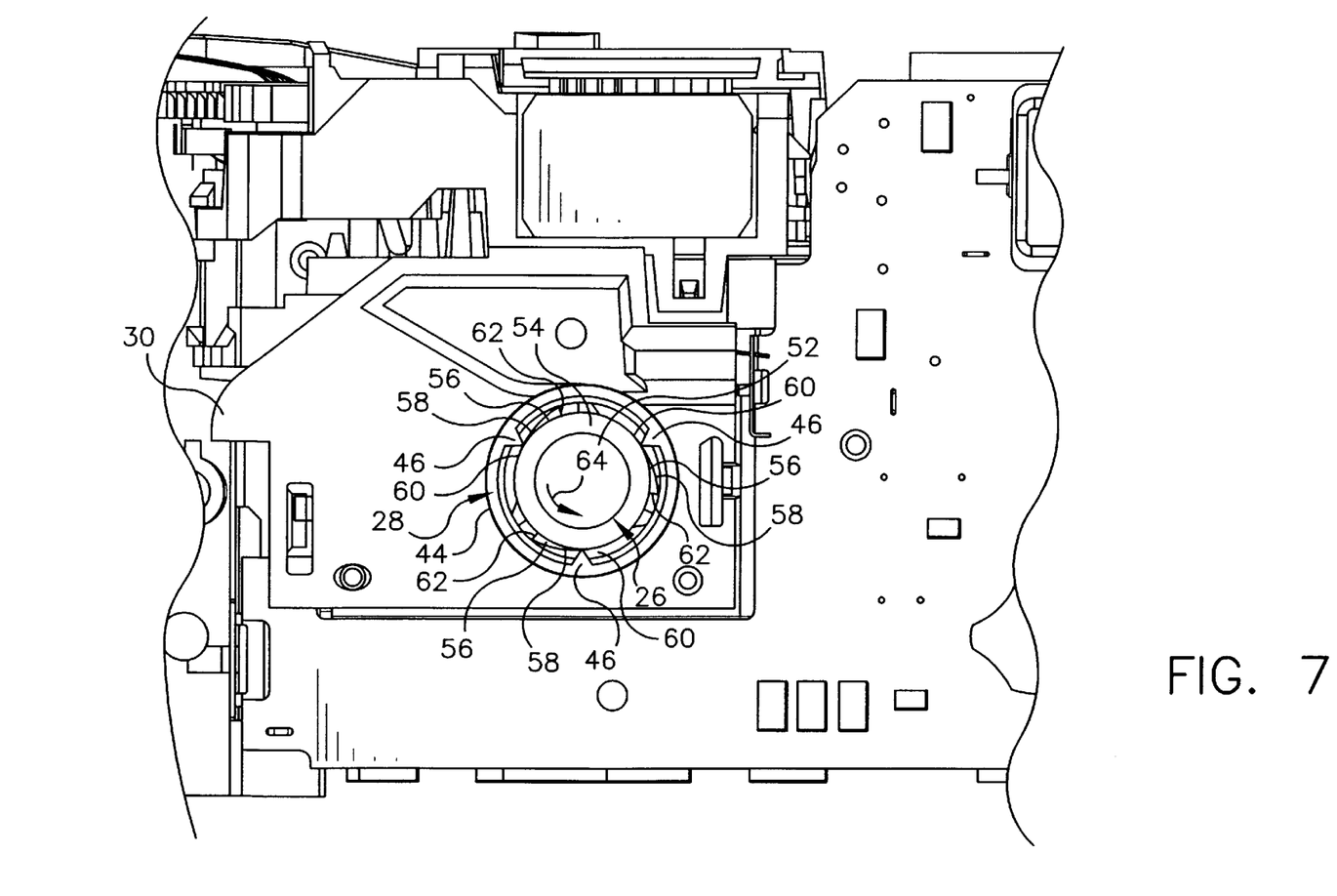
Figure 8:
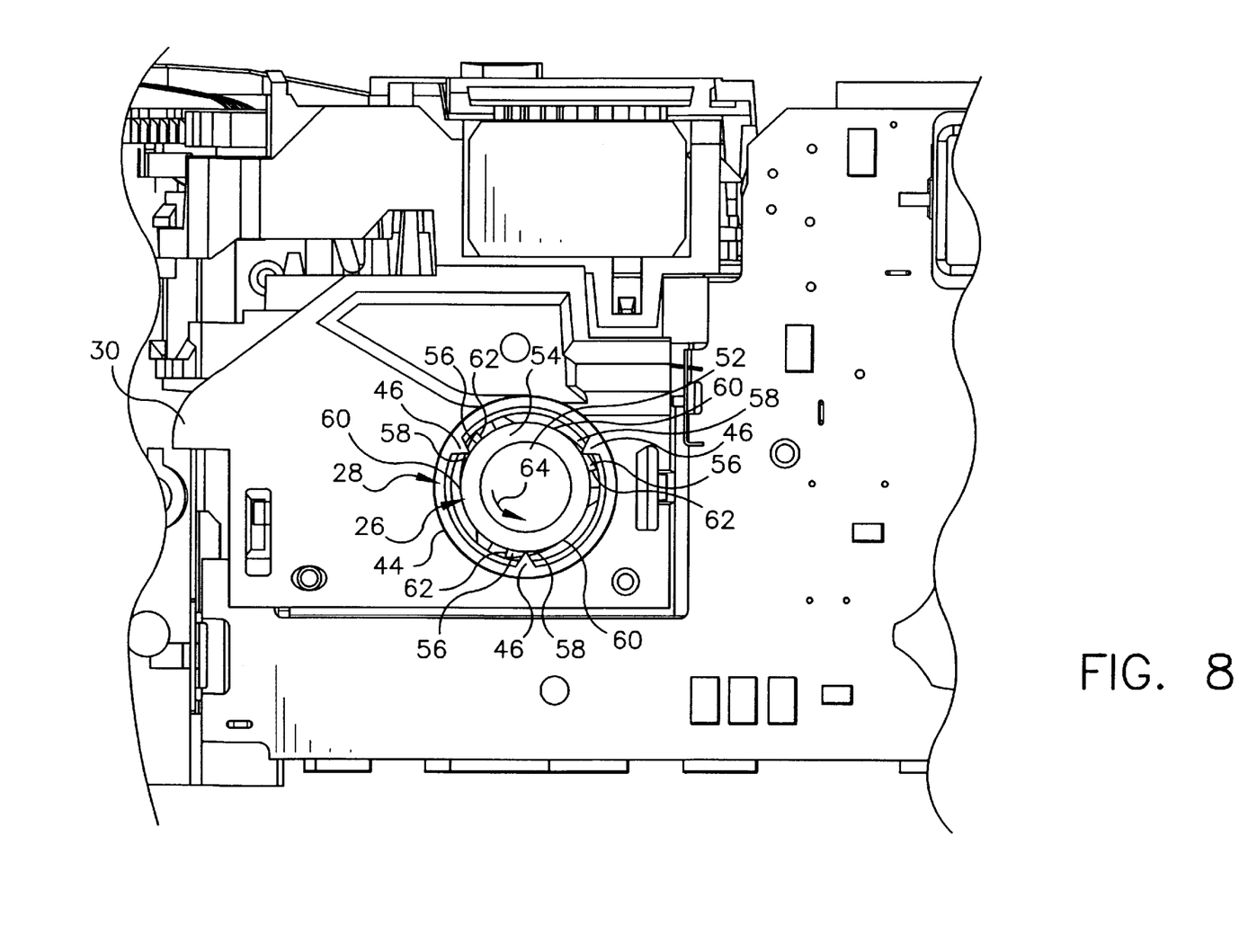

When the tool 66 is rotated in the cutting direction 64, as shown in FIGS. 7 and 8, the front taking lens 26 is similarly rotated to move the cutting edges 58 of the lens, beginning with their leading ends 60, to cut into the engageable portions 46 of the mount 28. The phrase "cut into" is used in the ordinary dictionary sense to mean "to penetrate with or as if with an edged instrument." As the cutting edges 58 of the front taking lens 26 progressively cut into the engageable portions 46 of the mount 28, they firmly engage the engaging portions 56 of the front taking lens 26 with the engageable portions of the mount 28 to secure the lens to the mount. Then, the tool 66 is separated from the front taking lens 26, and the front cover part 14 is connected to the rear cover part 16 at the hook-in-hole-connections 18.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. hook-in-hole connections
20. cartridge receiving chamber
22. film supply chamber
24. backframe opening
26. front taking lens
28. mount
30. lens plate
32. front lens opening
33. light-admitting opening
34. bottom
36. shutter blade
38. thumbwheel
40. narrow opening
42. film winding direction
44. circular peripheral rib
46. engageable portions
48. inner circular rib
50. raised pads
52. central imaging portion 54. circular rim portion
56. engaging portions
58. cutting edges
60. leading ends
62. trailing ends
64. cuffing direction
66. rotation tool
68. pins
70. notches

What is claimed is:

1. A rotary securing lens and mount assemblage comprising a lens which has a central imaging portion and a circular rim portion with several engaging portions, and a mount for said lens having several engageable portions equal in number to said engaging portions to engage with the respective engaging portions when said lens is rotated relative to said mount, is characterized in that:

said engaging portions and said engageable portions are mutually constructed to allow said engaging portions to cut into the respective engageable portions in order for said engaging portions to become engaged with the respective engageable portions when said lens is rotated relative to said mount.

2. A rotary securing lens and mount assemblage as recited in claim 1, wherein said engaging portions have individual cutting edges that are shaped to cut into the respective engageable portions.

3. A rotary securing lens and mount assemblage as recited in claim 2, wherein each one of said cutting edges is curved.

4. A rotary securing lens and mount assemblage as recited in claim 2, wherein each one of said cutting edges has a pair of extreme ends one of which is a leading end and the other is a trailing end when said lens is rotated relative to said mount.

5. A rotary securing lens and mount assemblage as recited in claim 4, wherein each one of said cutting edges is progressively narrowed from said trailing end to said leading end to similarly taper said cutting edges.

6. A rotary securing lens and mount assemblage as recited in claim 2, wherein each one of said engaging portions is elongated partially about said circular rim portion and has a gradual diminution in width from said circular rim portion to one of said cutting edges.

7. A rotary securing lens and mount assemblage as recited in claim 2, wherein said engageable portions are fixed in the way of said cutting edges to cause said cutting edges to cut into the respective engageable portions when said lens is rotated relative to said mount.

8. A rotary securing lens and mount assemblage as recited in claim 7, wherein said mount includes individual pads adjacent the respective engageable portions, and said circular rim portion rests on said pads to support said cutting edges to cut into the respective engageable portions.

9. A rotary securing lens and mount assemblage as recited in claim 1, wherein said circular rim portion includes individual notches adjacent the respective engaging portions to permit a rotation tool to be placed in said notches in order to rotate said lens relative to said mount.

10. A rotary securing lens and mount assemblage as recited in claim 1, wherein and said enagaging portions project radially outward, and said engageable portions project radially inward to be in the way of in the way of said engaging portions to cause said engaging portions to cut into the respective engageable portions when said lens is rotated relative to said mount.

11. A method of securing together a mount having several engageable portions and a lens which has a central imaging portion and a circular rim portion with several projecting cutting edges that are equal in number to the engageable portions to cut into the respective engageable portions to secure the lens to the mount when the lens is rotated relative to the mount, said method comprising the steps:

rotationally coupling a rotation tool with the lens; and rotating the tool to rotate the lens relative to the mount in order to cause the cutting edges to cut into the respective engageable portions of the mount.

* * * * *